(12) United States Patent
Jiang et al.

(10) Patent No.: US 10,955,517 B2
(45) Date of Patent: Mar. 23, 2021

(54) UNDERWATER ULTRASONIC DEVICE

(71) Applicant: QISDA CORPORATION, Taoyuan (TW)

(72) Inventors: Fu-Sheng Jiang, Taoyuan (TW); Chun-Chieh Wang, New Taipei (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/787,048

(22) Filed: Feb. 11, 2020

(65) Prior Publication Data

US 2020/0326400 A1    Oct. 15, 2020

(30) Foreign Application Priority Data

Apr. 10, 2019 (TW) ................. 108112484

(51) Int. Cl.
| | | |
|---|---|---|
| *G01S 3/805* | (2006.01) | |
| *G01S 7/521* | (2006.01) | |
| *G01S 7/524* | (2006.01) | |
| *G01S 7/526* | (2006.01) | |
| *G01S 7/54* | (2006.01) | |

(52) U.S. Cl.
CPC .............. *G01S 3/805* (2013.01); *G01S 7/521* (2013.01); *G01S 7/524* (2013.01); *G01S 7/526* (2013.01); *G01S 7/54* (2013.01)

(58) Field of Classification Search
CPC .......... G01S 3/805; G01S 7/524; G01S 7/521; G01S 7/526; G01S 7/54
See application file for complete search history.

(56) References Cited

U.S. PATENT DOCUMENTS

| | | | |
|---|---|---|---|
| 5,561,641 A | 10/1996 | Nishimori | |
| 5,805,528 A | 9/1998 | Hamada | |
| 5,966,169 A * | 10/1999 | Bullis | G01S 15/8993 |
| | | | 348/81 |
| 9,759,813 B2 | 9/2017 | Smith | |
| 2010/0030077 A1* | 2/2010 | Mori | A61B 8/463 |
| | | | 600/443 |
| 2015/0182195 A1* | 7/2015 | Liu | A61B 8/54 |
| | | | 600/459 |
| 2020/0326400 A1* | 10/2020 | Jiang | G01S 7/54 |

FOREIGN PATENT DOCUMENTS

| | | |
|---|---|---|
| CN | 203133279 U | 8/2013 |
| WO | 2016071961 A1 | 5/2016 |

* cited by examiner

*Primary Examiner* — Daniel Pihulic

(57) ABSTRACT

An underwater ultrasonic device includes at least one first ultrasonic transducer and at least one second ultrasonic transducer. The first ultrasonic transducer is configured to transmit a plurality of ultrasonic signals and the second ultrasonic transducer is configured to receive a plurality of reflected signals of the ultrasonic signals. The first ultrasonic transducer and the second ultrasonic transducer are disposed with respect to each other. One of the first ultrasonic transducer and the second ultrasonic transducer is curvilinear and another one of the first ultrasonic transducer and the second ultrasonic transducer is curvilinear or straight linear.

11 Claims, 10 Drawing Sheets

UNDERWATER ULTRASONIC DEVICE

BACKGROUND OF THE INVENTION

1. Field of the Invention

The invention relates to an underwater ultrasonic device and, more particularly, to an underwater ultrasonic device capable of expanding a measuring range effectively.

2. Description of the Prior Art

Since ultrasound does not destroy material structure and harm living thing, an underwater ultrasonic device is in widespread use for the field of underwater measurement. The conventional underwater ultrasonic device for a wide-angle measuring range essentially consists of a plurality of ultrasonic transducers and each of which transmits and receives ultrasound individually. In other words, the conventional underwater ultrasonic device forms a wide-angle measuring range by a plurality of measuring ranges of the ultrasonic transducers. However, when the ultrasonic transducers are spliced together, a lot of blind spots may be formed between the ultrasonic transducers, such that the accuracy of measurement may be influenced.

SUMMARY OF THE INVENTION

An objective of the invention is to provide an underwater ultrasonic device capable of expanding a measuring range effectively.

According to an embodiment of the invention, an underwater ultrasonic device comprises at least one first ultrasonic transducer and at least one second ultrasonic transducer. The first ultrasonic transducer is configured to transmit a plurality of ultrasonic signals. The second ultrasonic transducer is configured to receive a plurality of reflected signals of the ultrasonic signals. The first ultrasonic transducer and the second ultrasonic transducer are disposed with respect to each other. One of the first ultrasonic transducer and the second ultrasonic transducer is curvilinear, and another one of the first ultrasonic transducer and the second ultrasonic transducer is curvilinear or straight linear.

As mentioned in the above, the underwater ultrasonic device of the invention utilizes the first ultrasonic transducer to transmit the ultrasonic signals and utilizes the second ultrasonic transducer to receive the reflected signals of the ultrasonic signals. The invention may form a wide-angle measuring range by overlapping a transmitting range of the first ultrasonic transducer and a receiving range of the second ultrasonic transducer. Furthermore, if a target is moving, the invention may change a displacement between the first ultrasonic transducer and the second ultrasonic transducer to change the measuring range along with the movement of the target, so as to track the target.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
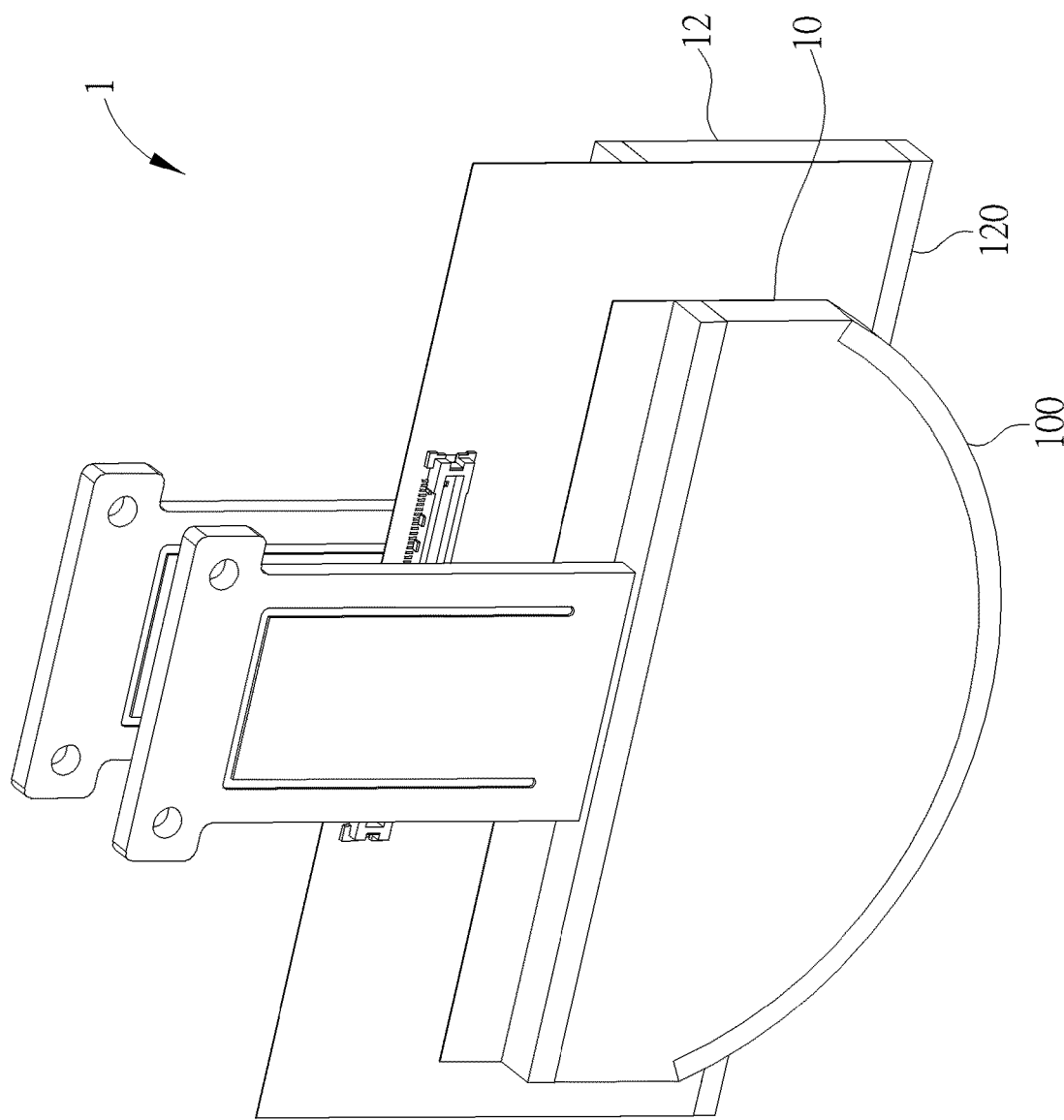
FIG. 1 is a perspective view illustrating an underwater ultrasonic device according to an embodiment of the invention.
Figure 2:
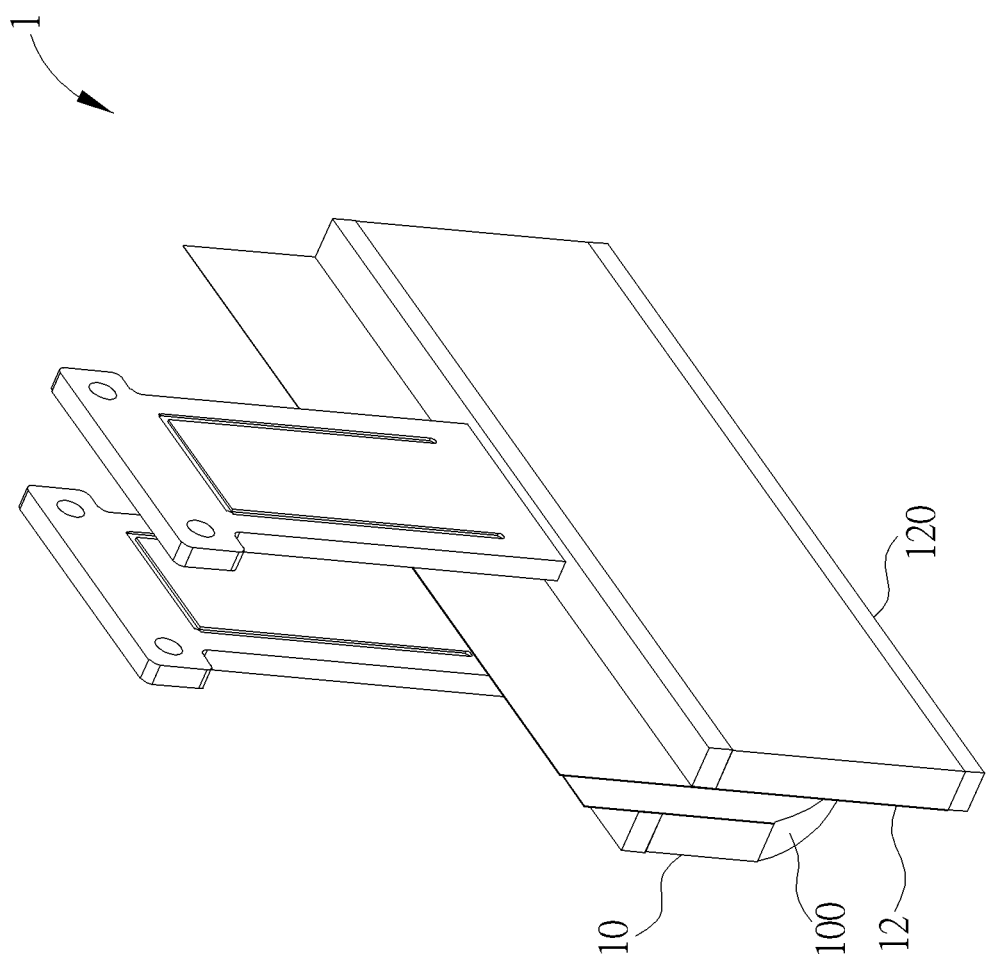
FIG. 2 is a perspective view illustrating the underwater ultrasonic device shown in FIG. 1 from another viewing angle.
Figure 3:
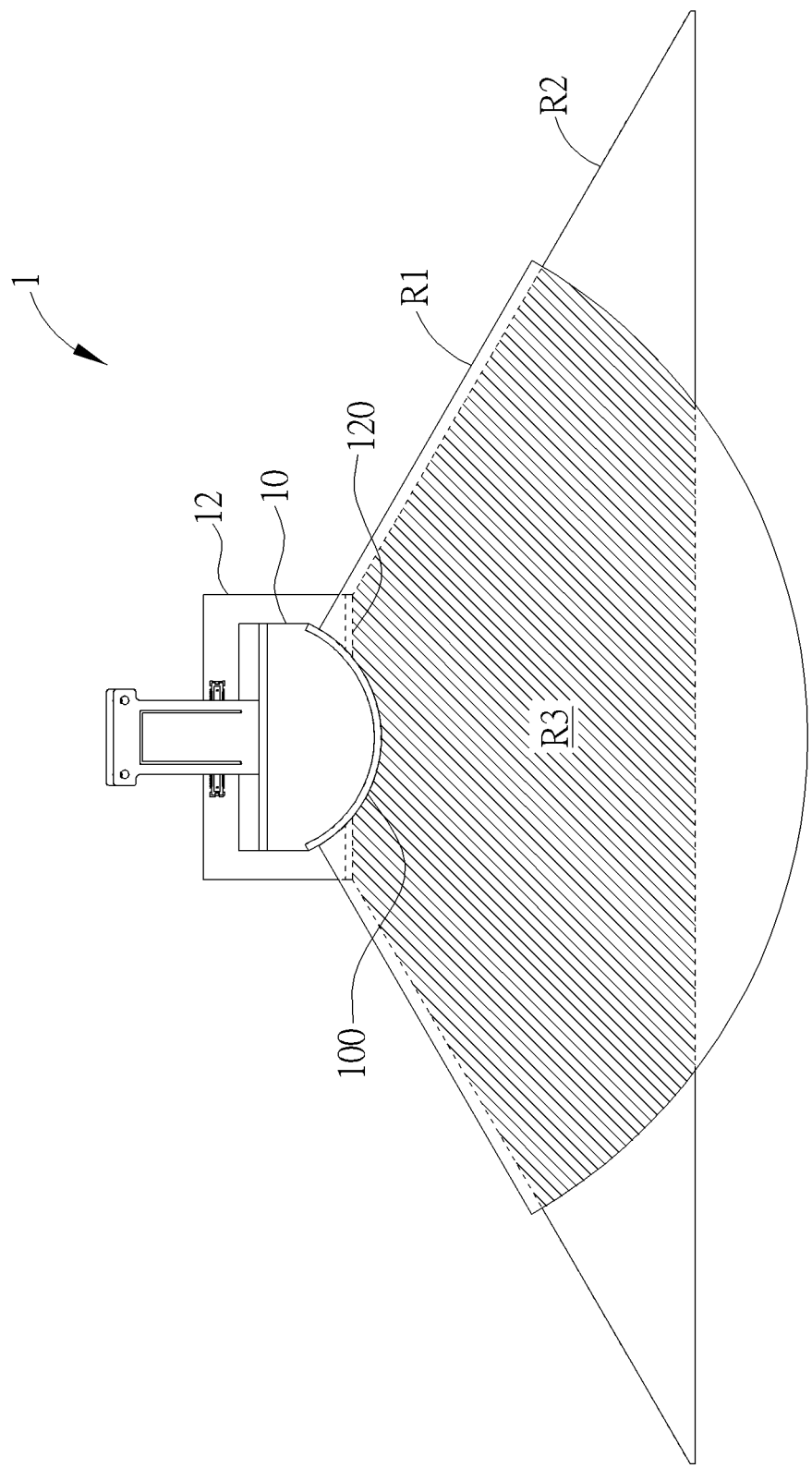
FIG. 3 is a front view illustrating the underwater ultrasonic device shown in FIG. 1.
Figure 4:
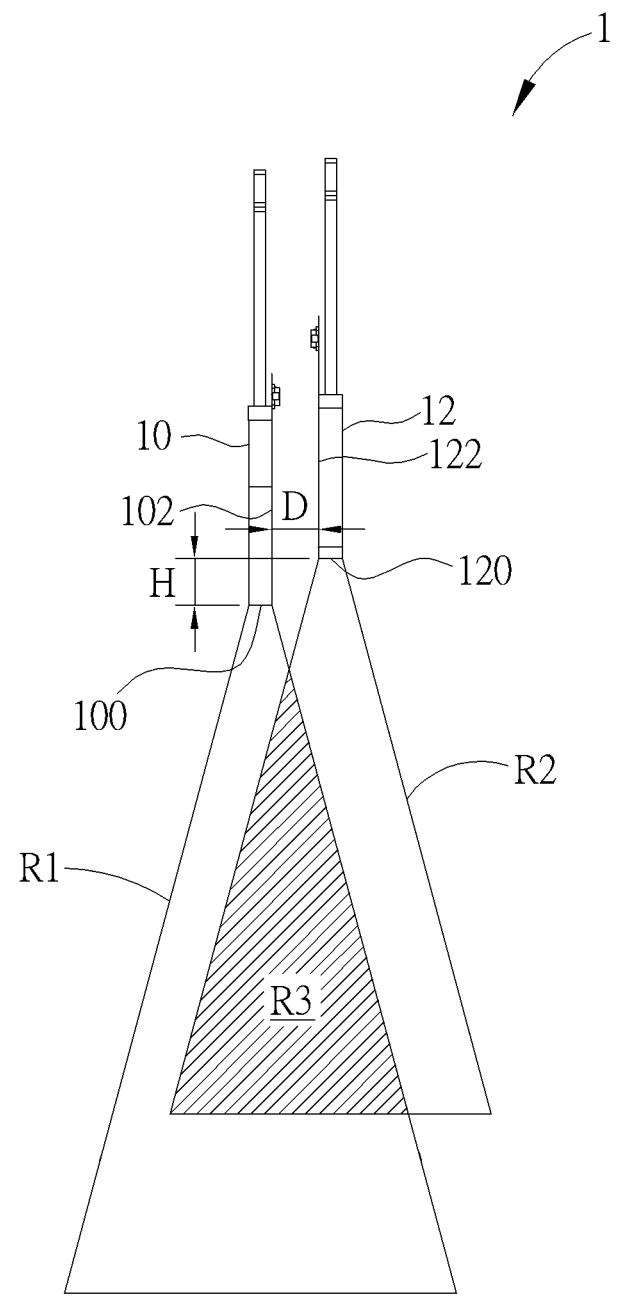
FIG. 4 is a side view illustrating the underwater ultrasonic device shown in FIG. 1.

Referring to FIGS. 1 to 4, FIG. 1 is a perspective view illustrating an underwater ultrasonic device 1 according to an embodiment of the invention, FIG. 2 is a perspective view illustrating the underwater ultrasonic device 1 shown in FIG. 1 from another viewing angle, FIG. 3 is a front view illustrating the underwater ultrasonic device 1 shown in FIG. 1, and FIG. 4 is a side view illustrating the underwater ultrasonic device 1 shown in FIG. 1.

As shown in FIGS. 1 to 4, the underwater ultrasonic device 1 comprises a first ultrasonic transducer 10 and a second ultrasonic transducer 12, wherein the first ultrasonic transducer 10 and the second ultrasonic transducer 12 are disposed with respect to each other. In this embodiment, the first ultrasonic transducer 10 has a bending surface 100 for transmitting or receiving ultrasound signals, the first ultrasonic transducer 10 is called curvilinear and the second ultrasonic transducer 12 has a straight surface 120 for transmitting or receiving ultrasound signals, the second ultrasonic transducer 12 is called straight linear. In another embodiment, the first ultrasonic transducer 10 may be straight linear and the second ultrasonic transducer 12 may be curvilinear. In another embodiment, the first ultrasonic transducer 10 and the second ultrasonic transducer 12 both may be curvilinear. In other words, according to practical applications, one of the first ultrasonic transducer 10 and the second ultrasonic transducer 12 may be curvilinear, and another one of the first ultrasonic transducer 10 and the second ultrasonic transducer 12 may be curvilinear or straight linear. It should be noted that a phased array ultrasonic transducer is also a straight linear ultrasonic transducer mentioned in the invention.

In this embodiment, the first ultrasonic transducer 10 is configured to transmit a plurality of ultrasonic signals. When the ultrasonic signals reach an object, a plurality of reflected signals are generated correspondingly. The second ultrasonic transducer 12 is configured to receive a plurality of reflected signals of the ultrasonic signals. As shown in FIGS. 3 and 4, an ultrasonic transmitting surface 100 of the first ultrasonic transducer 10 has a transmitting range R1 and an ultrasonic receiving surface 120 of the second ultrasonic transducer 12 has a receiving range R2, wherein the transmitting range R1 and the receiving range R2 has an overlapping range R3. Accordingly, the invention may form a wide-angle measuring range (i.e. the overlapping range R3) by overlapping the transmitting range R1 of the first ultrasonic transducer 10 and the receiving range R2 of the second ultrasonic transducer 12 to form the overlapping range R3. Furthermore, the invention may obtain different measuring ranges by adjusting the overlapping range R3 between the transmitting range R1 of the first ultrasonic transducer 10 and the receiving range R2 of the second ultrasonic transducer 12.

As shown in FIG. 4, the first ultrasonic transducer 10 and the second ultrasonic transducer 12 are disposed with respect to each other along a direction of short edge. In this embodiment, a side surface 102 of the first ultrasonic transducer 10 and a side surface 122 of the second ultrasonic transducer 12 may be spaced a first distance D, and the ultrasonic transmitting surface 100 of the first ultrasonic transducer 10 and the ultrasonic receiving surface 120 of the second ultrasonic transducer 12 may be spaced a second distance H. For further illustration, the side surface 102 of the first ultrasonic transducer 10 and the side surface 122 of the second ultrasonic transducer 12 may move with respect to each other horizontally and a horizontal moving distance is the aforesaid first distance D; the ultrasonic transmitting surface 100 of the first ultrasonic transducer 10 and the ultrasonic receiving surface 120 of the second ultrasonic transducer 12 may move with respect to each other vertically and a vertical moving distance is the aforesaid second distance H.

In this embodiment, the first ultrasonic transducer 10 is curvilinear. Accordingly, a radius of curvature of the first ultrasonic transducer 10 may be between $\frac{1}{200}$ (1/mm) and $\frac{1}{5}$ (1/mm), the first distance D may be between 0 mm and 50 mm, and the second distance H may be between 0 mm and 50 mm. In another embodiment, if the second ultrasonic transducer 12 is curvilinear, a radius of curvature of the second ultrasonic transducer 12 may be between $\frac{1}{200}$ (1/mm) and $\frac{1}{5}$ (1/mm), the first distance D may be between 0 mm and 50 mm, and the second distance H may be between 0 mm and 50 mm. In another embodiment, if the first ultrasonic transducer 10 and the second ultrasonic transducer 12 both are curvilinear, a radius of curvature of the first ultrasonic transducer 10 may be between $\frac{1}{200}$ (1/mm) and $\frac{1}{5}$ (1/mm), a radius of curvature of the second ultrasonic transducer 12 may be between $\frac{1}{200}$ (1/mm) and $\frac{1}{5}$ (1/mm), the first distance D may be between 0 mm and 50 mm, and the second distance H may be between 0 mm and 50 mm. By means of the aforesaid limitations of the radius of curvature, the first distance D and the second distance H, the invention may effectively prevent the ultrasonic signals transmitted by the first ultrasonic transducer 10 and the reflected signals received by the second ultrasonic transducer 12 from influencing each other.

Figure 5:
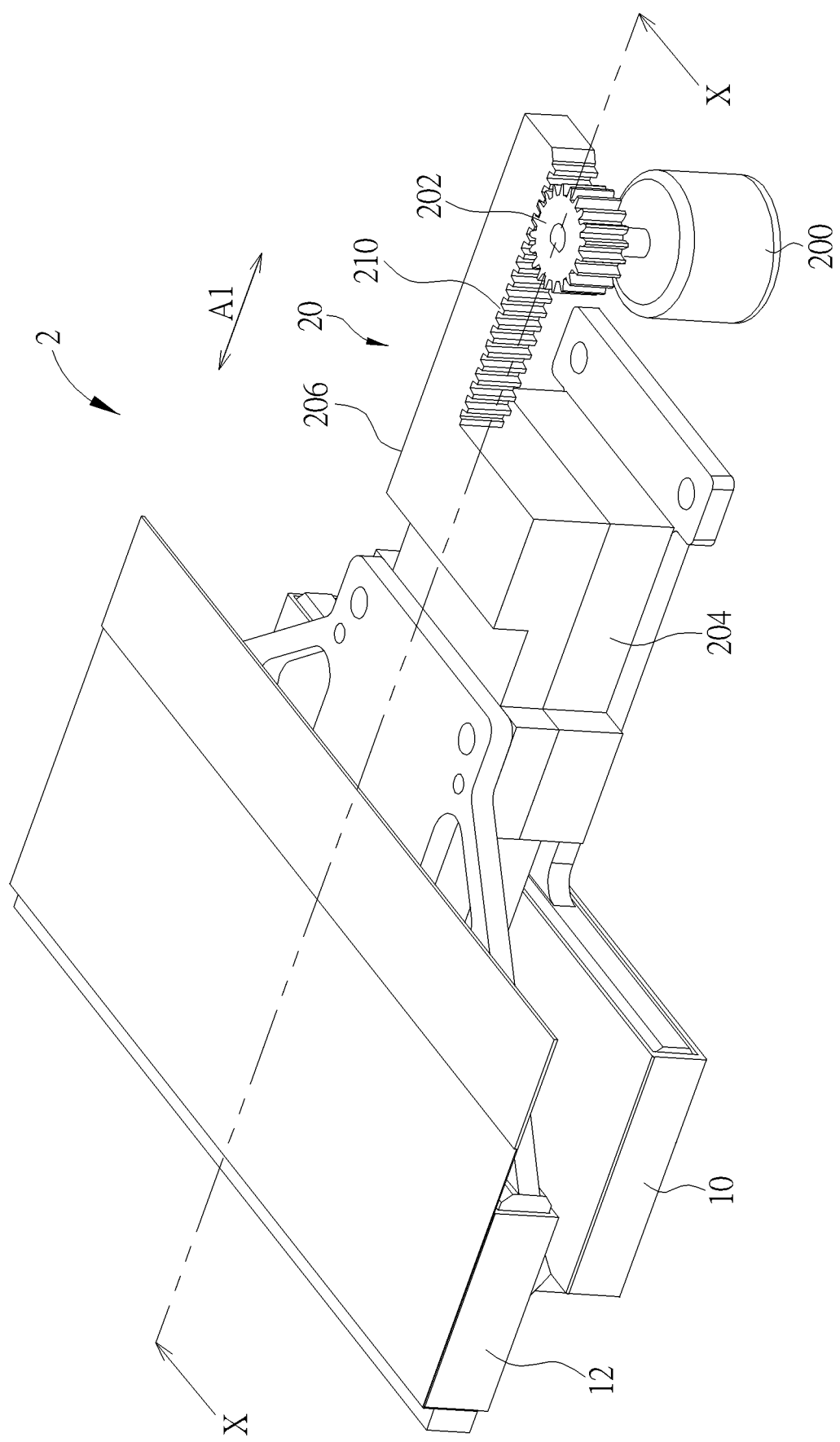
FIG. 5 is a perspective view illustrating an underwater ultrasonic device according to another embodiment of the invention.
Figure 6:
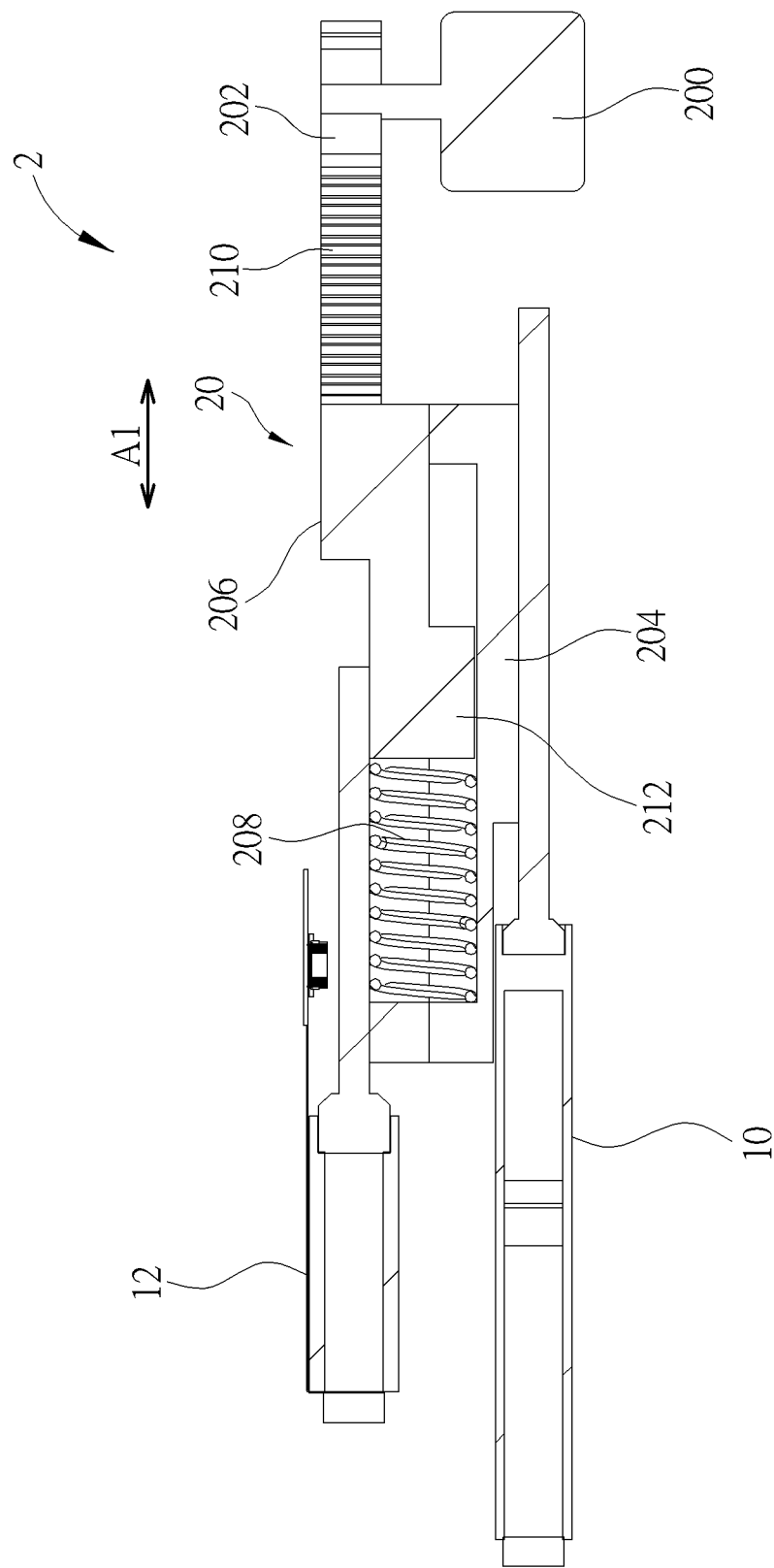
FIG. 6 is a sectional view illustrating the underwater ultrasonic device shown in FIG. 5.

Referring to FIGS. 5 and 6, FIG. 5 is a perspective view illustrating an underwater ultrasonic device 2 according to another embodiment of the invention and FIG. 6 is a sectional view illustrating the underwater ultrasonic device 2 shown in FIG. 5. The main difference between the underwater ultrasonic device 2 and the aforesaid underwater ultrasonic device 1 is that the underwater ultrasonic device 2 further comprises a moving mechanism 20, as shown in FIGS. 5 and 6. In this embodiment, the moving mechanism 20 may comprises a motor 200, a gear 202, a first sliding member 204, a second sliding member 206 and an elastic member 208. The first sliding member 204 is connected to the first ultrasonic transducer 10 and the second sliding member 206 is connected to the second ultrasonic transducer 12, wherein the first sliding member 204 and the second sliding member 206 are disposed with respect to each other. The second sliding member 206 has a rack 210 and a restraining portion 212. The gear 202 is connected to the motor 200 and meshes with the rack 210. The elastic member 208 is disposed between the first sliding member 204 and the second sliding member 206 and abuts against the restraining portion 212. In this embodiment, the elastic member 208 may be a spring for providing an elastic force, so as to eliminate clearance of the gear 202.

When the motor 200 drives the gear 202 to rotate, the gear 202 drives the second sliding member 206 to move with respect to the first sliding member 204 along a direction of a double-headed arrow A1 through the rack 210, so as to drive the second ultrasonic transducer 12 to move with respect to the first ultrasonic transducer 10 along the direction of the double-headed arrow A1. Accordingly, the overlapping range R3 (as shown in FIGS. 3 and 4) between the transmitting range R1 of the first ultrasonic transducer 10 and the receiving range R2 of the second ultrasonic transducer 12 can be adjusted.

It should be noted that the invention may also connect the second sliding member 206 to the first ultrasonic transducer 10 and connect the first sliding member 204 to the second ultrasonic transducer 12, such that the moving mechanism 20 may be configured to move the first ultrasonic transducer 10. In other words, the moving mechanism 20 may be configured to move at least one of the first ultrasonic transducer 10 and the second ultrasonic transducer 12 according to practical applications. Furthermore, the invention may dispose three moving mechanisms 20 for three axes X, Y, Z of the underwater ultrasonic device 2, respectively, so as to move at least one of the first ultrasonic transducer 10 and the second ultrasonic transducer 12 along at least one of the three axes X, Y, Z by the moving mechanism 20.

Figure 7:
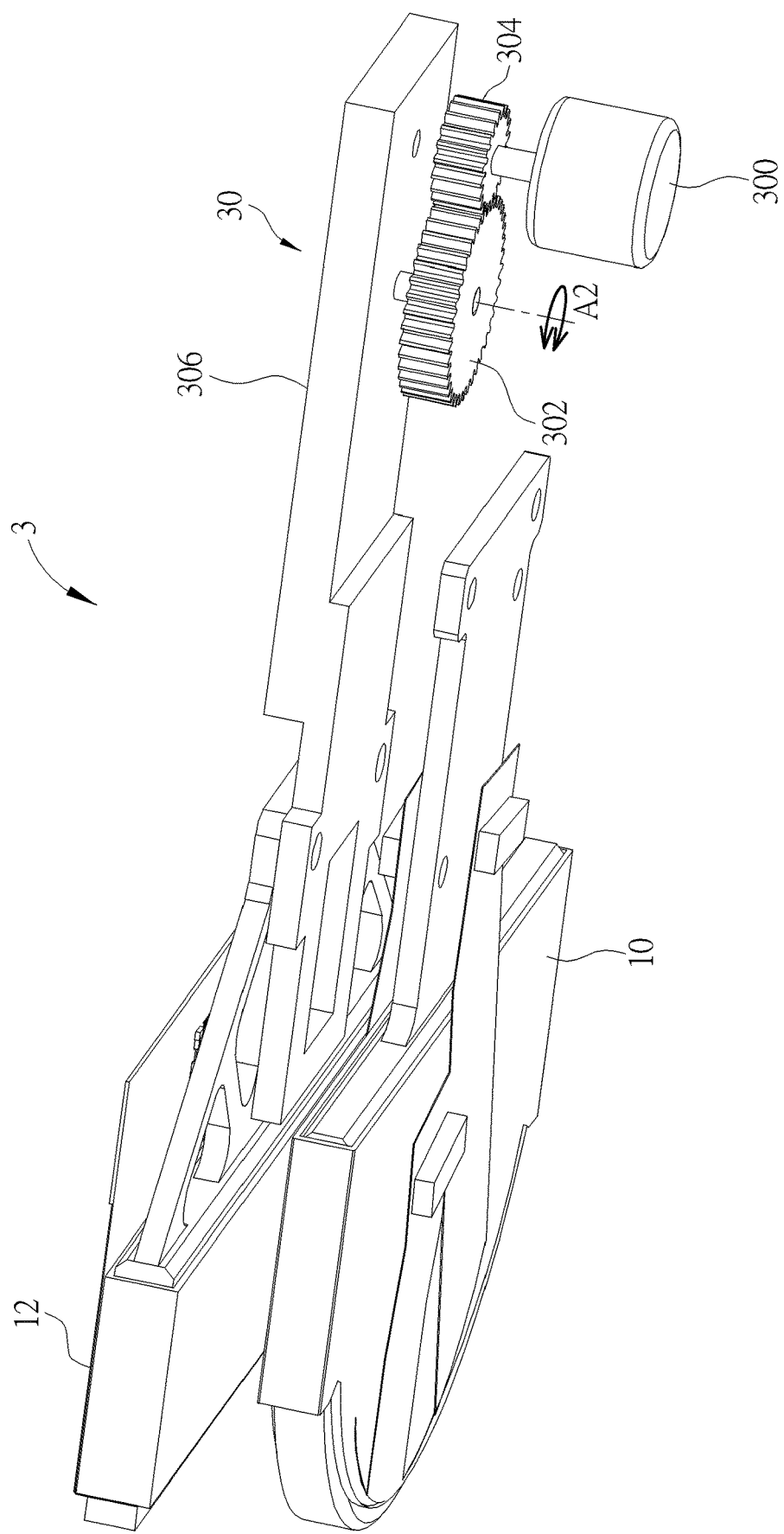
FIG. 7 is a perspective view illustrating an underwater ultrasonic device according to another embodiment of the invention.

Referring to FIG. 7, FIG. 7 is a perspective view illustrating an underwater ultrasonic device 3 according to another embodiment of the invention. The main difference between the underwater ultrasonic device 3 and the aforesaid underwater ultrasonic device 1 is that the underwater ultrasonic device 3 further comprises a rotating mechanism 30, as shown in FIG. 7. In this embodiment, the rotating mechanism 30 may comprise a motor 300, a first gear 302, a second gear 304 and a rotating member 306. The rotating member 306 is connected to the second ultrasonic transducer 12. The first gear 302 is connected to the rotating member 306. The second gear 304 is connected to the motor 300 and meshes with the first gear 302.

When the motor 300 drives the second gear 304 to rotate, the second gear 304 drives the rotating member 306 to rotate along a direction of a double-headed arrow A2 through the first gear 302, so as to drive the second ultrasonic transducer 12 to rotate with respect to the first ultrasonic transducer 10 along the direction of the double-headed arrow A2. Accordingly, the overlapping range R3 (as shown in FIGS. 3 and 4) between the transmitting range R1 of the first ultrasonic transducer 10 and the receiving range R2 of the second ultrasonic transducer 12 can be adjusted.

It should be noted that the invention may also connect the rotating member 306 to the first ultrasonic transducer 10, such that the rotating mechanism 30 may be configured to rotate the first ultrasonic transducer 10. In other words, the rotating mechanism 30 may be configured to rotate at least one of the first ultrasonic transducer 10 and the second ultrasonic transducer 12 according to practical applications. Furthermore, the invention may dispose three rotating mechanisms 30 for three axes X, Y, Z of the underwater ultrasonic device 3, respectively, so as to rotate at least one of the first ultrasonic transducer 10 and the second ultrasonic transducer 12 about at least one of the three axes X, Y, Z by the rotating mechanism 30.

In another embodiment, the underwater ultrasonic device 1 of the invention may further comprise a shifting mechanism coupled to the first ultrasonic transducer 10 and the second ultrasonic transducer 12 and configured to change a displacement between the first ultrasonic transducer 10 and the second ultrasonic transducer 12. The overlapping range R3 (as shown in FIGS. 3 and 4) between the transmitting range R1 of the first ultrasonic transducer 10 and the receiving range R2 of the second ultrasonic transducer 12 will change while the displacement changes. The shifting mechanism may be the aforesaid moving mechanism 20, the aforesaid rotating mechanism 30, or a combination thereof according to practical applications.

Figure 8:
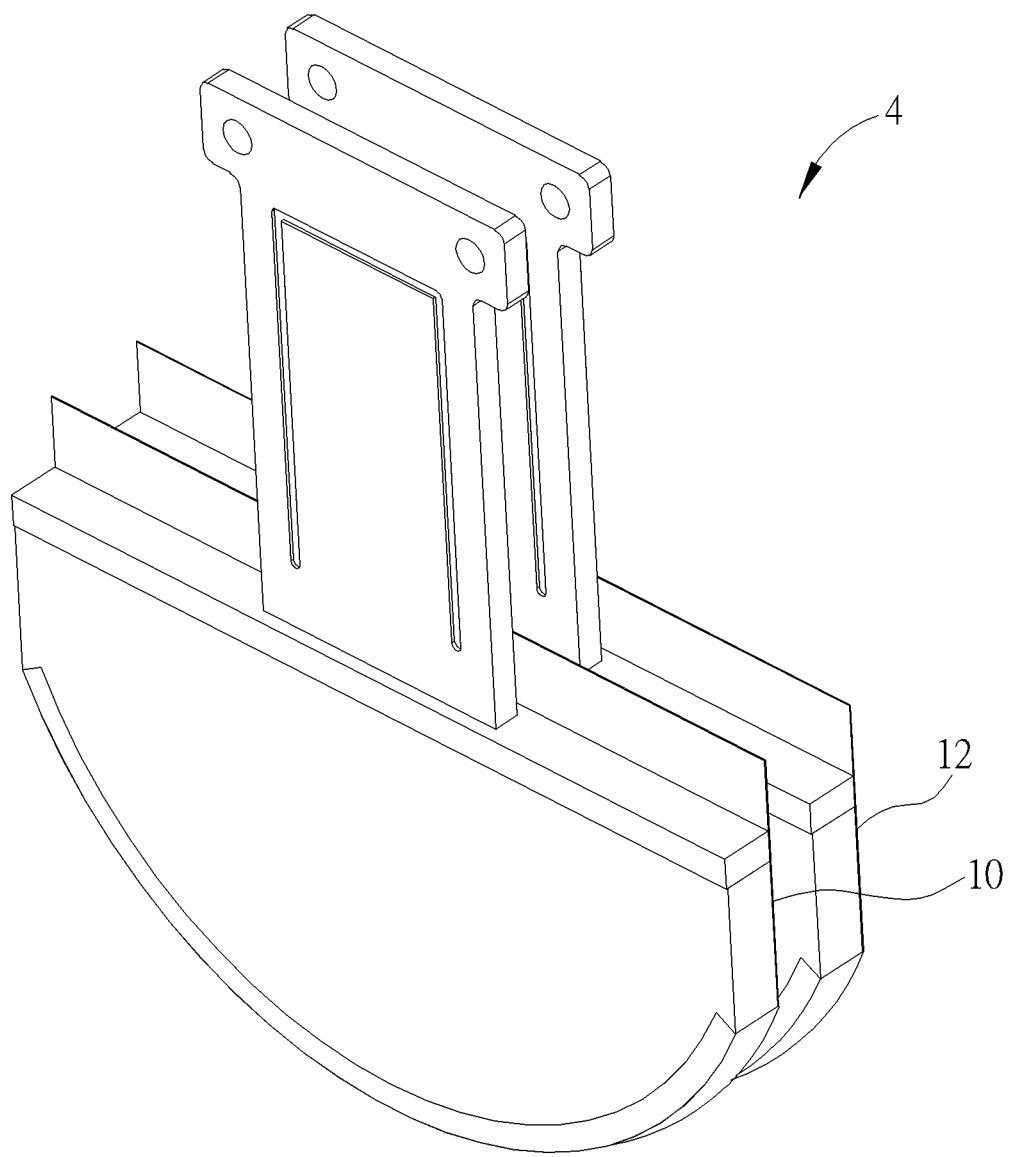
FIG. 8 is a perspective view illustrating an underwater ultrasonic device according to another embodiment of the invention.

Referring to FIG. 8, FIG. 8 is a perspective view illustrating an underwater ultrasonic device 4 according to another embodiment of the invention. The main difference between the underwater ultrasonic device 4 and the aforesaid underwater ultrasonic device 1 is that the first ultrasonic transducer 10 and the second ultrasonic transducer 12 of the underwater ultrasonic device 4 both are curvilinear, as shown in FIG. 8. Therefore, according to the aforesaid embodiments, one of the first ultrasonic transducer 10 and the second ultrasonic transducer 12 may be curvilinear, and another one of the first ultrasonic transducer 10 and the second ultrasonic transducer 12 may be curvilinear or straight linear according to practical applications.

Figure 9:
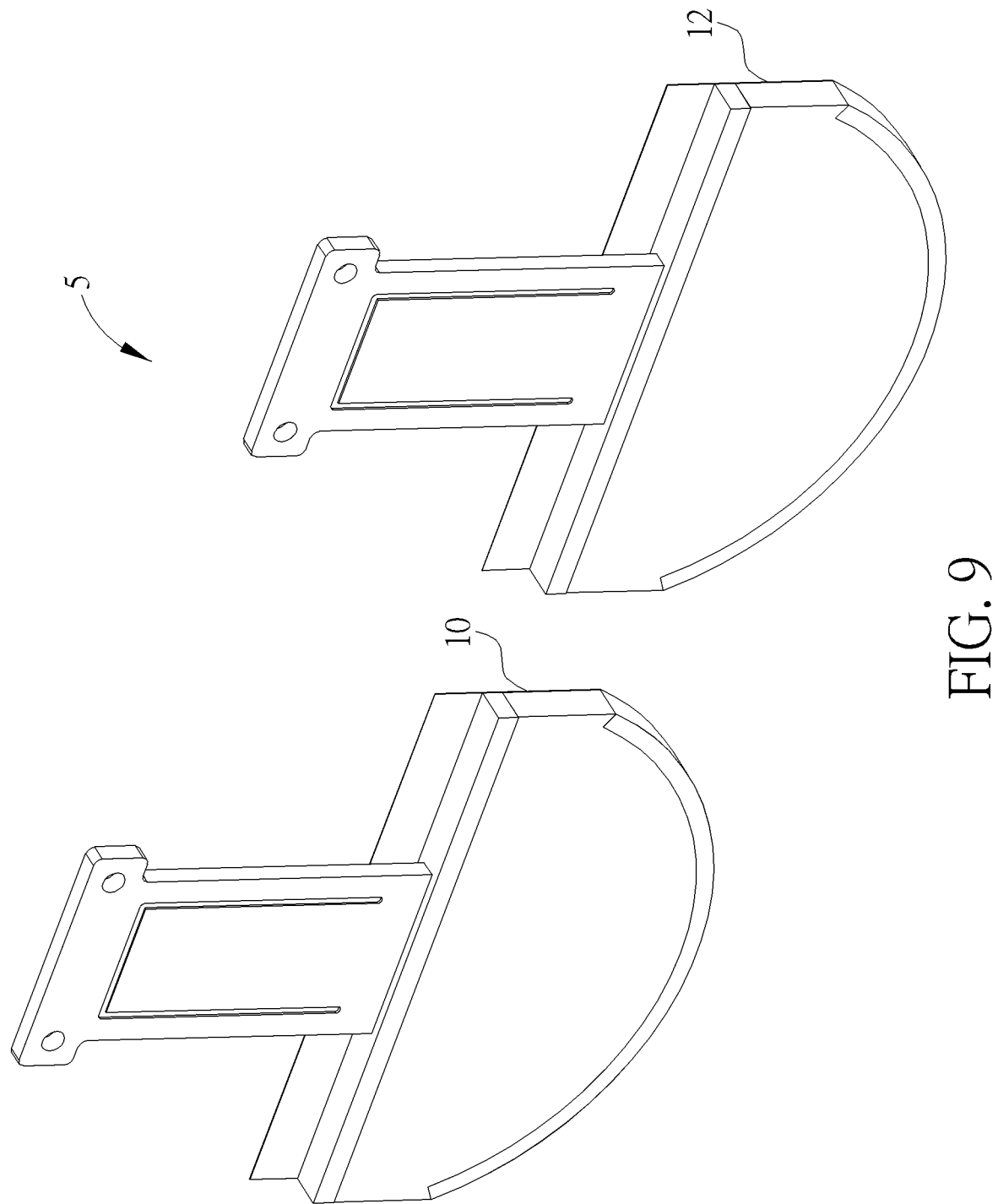
FIG. 9 is a perspective view illustrating an underwater ultrasonic device according to another embodiment of the invention.

Referring to FIG. 9, FIG. 9 is a perspective view illustrating an underwater ultrasonic device 5 according to another embodiment of the invention. The main difference between the underwater ultrasonic device 5 and the aforesaid underwater ultrasonic device 4 is that the first ultrasonic transducer 10 and the second ultrasonic transducer 12 of the underwater ultrasonic device 5 are disposed with respect to each other along a direction of long edge, as shown in FIG. 9. Therefore, according to the aforesaid embodiments, the first ultrasonic transducer 10 and the second ultrasonic transducer 12 may be disposed with respect to each other along a direction of short edge or long edge according to practical applications.

Figure 10:
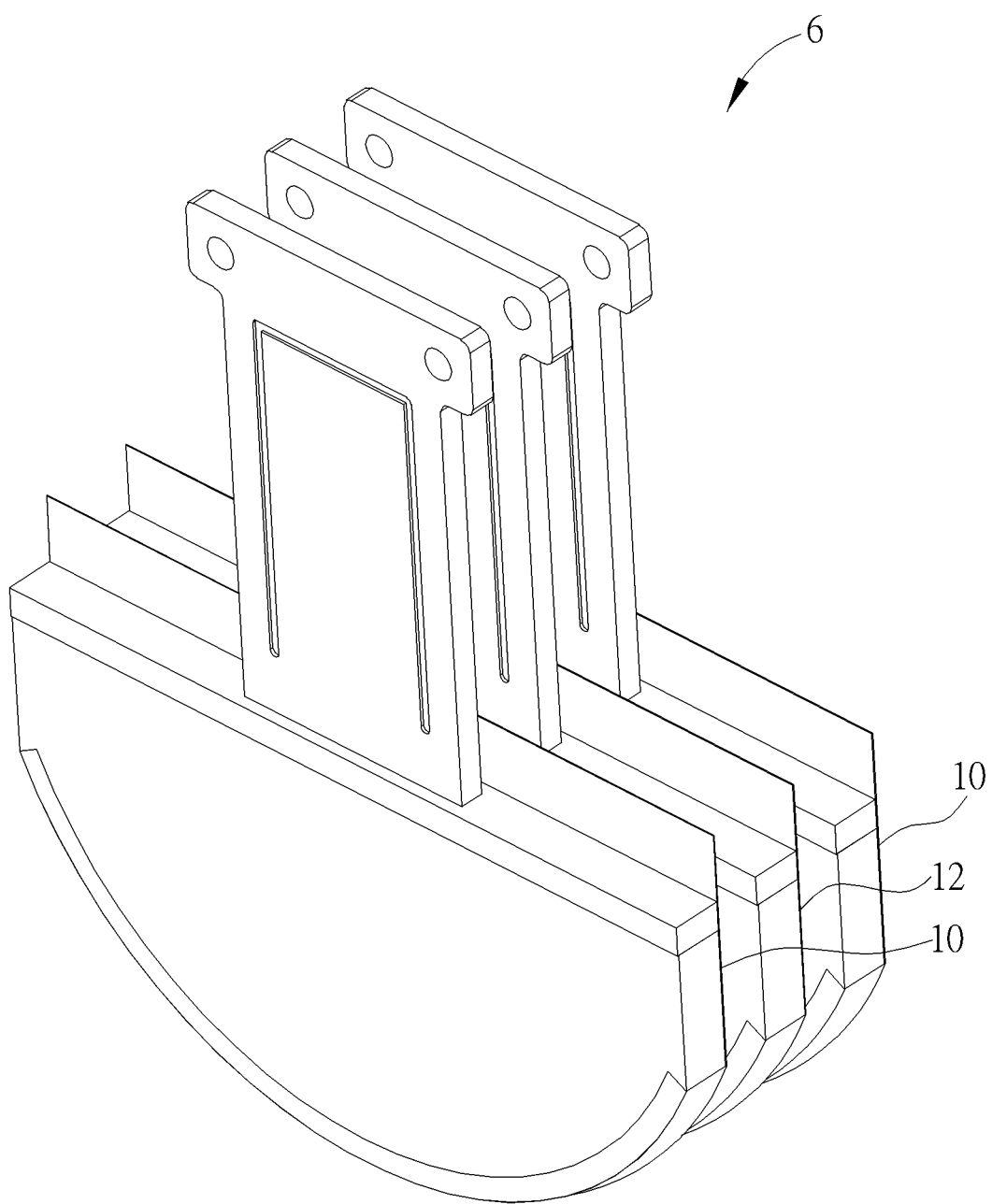
FIG. 10 is a perspective view illustrating an underwater ultrasonic device according to another embodiment of the invention.

Referring to FIG. 10, FIG. 10 is a perspective view illustrating an underwater ultrasonic device 6 according to another embodiment of the invention. The main difference between the underwater ultrasonic device 6 and the aforesaid underwater ultrasonic device 4 is that the underwater ultrasonic device 6 comprises two first ultrasonic transducers 10 and one second ultrasonic transducer 12, as shown in FIG. 10. In this embodiment, the second ultrasonic transducer 12 may be disposed between the two first ultrasonic transducers 10. The two first ultrasonic transducers 10 may be configured to transmit a plurality of ultrasonic signals and the second ultrasonic transducer 12 may be configured to receive a plurality of reflected signals of the ultrasonic signals. Accordingly, the invention may provide a measuring range with a wider angle. Needless to say, the second ultrasonic transducer 12 may be configured to transmit a plurality of ultrasonic signals and the two first ultrasonic transducers 10 may be configured to receive a plurality of reflected signals of the ultrasonic signals. Therefore, according to the aforesaid embodiments, the invention may dispose at least one first ultrasonic transducer 10 and at least one second ultrasonic transducer 12 with respect to each other, so as to provide a measuring range with a wider angle.

As mentioned in the above, the underwater ultrasonic device of the invention utilizes the first ultrasonic transducer to transmit the ultrasonic signals and utilizes the second ultrasonic transducer to receive the reflected signals of the ultrasonic signals. The invention may form a wide-angle measuring range by overlapping a transmitting range of the first ultrasonic transducer and a receiving range of the second ultrasonic transducer. Furthermore, if a target is moving, the invention may change a displacement between the first ultrasonic transducer and the second ultrasonic transducer to change the measuring range along with the movement of the target, so as to track the target.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An underwater ultrasonic device comprising:
   at least one first ultrasonic transducer configured to transmit a plurality of ultrasonic signals; and
   at least one second ultrasonic transducer configured to receive a plurality of reflected signals of the ultrasonic signals, the first ultrasonic transducer and the second ultrasonic transducer being plate-shaped and stacked in parallel to each other, one of an ultrasonic transmitting surface of the first ultrasonic transducer and an ultrasonic receiving surface of the second ultrasonic transducer being curvilinear, another one of the ultrasonic transmitting surface of the first ultrasonic transducer and the ultrasonic receiving surface of the second ultrasonic transducer being curvilinear or straight linear.

2. The underwater ultrasonic device of claim 1, wherein a side surface of the first ultrasonic transducer and a side surface of the second ultrasonic transducer are spaced a first distance.

3. The underwater ultrasonic device of claim 2, wherein a radius of curvature of at least one of the first ultrasonic transducer and the second ultrasonic transducer is between 1/200 (1/mm) and 1/5 (1/mm), and the first distance is between 0 mm and 50 mm.

4. The underwater ultrasonic device of claim 1, wherein an ultrasonic transmitting surface of the first ultrasonic transducer and an ultrasonic receiving surface of the second ultrasonic transducer are spaced a second distance.

5. The underwater ultrasonic device of claim 4, wherein a radius of curvature of at least one of the first ultrasonic transducer and the second ultrasonic transducer is between 1/200 (1/mm) and 1/5 (1/mm), and the second distance is between 0 mm and 50 mm.

6. The underwater ultrasonic device of claim 4, wherein the ultrasonic transmitting surface has a transmitting range, the ultrasonic receiving surface has a receiving range, the transmitting range and the receiving range have an overlapping range, the underwater ultrasonic device further comprises:
   a shifting mechanism coupled to the first ultrasonic transducer and the second ultrasonic transducer and configured to change a displacement between the first ultrasonic transducer and the second ultrasonic transducer, wherein the overlapping range changes while the displacement changes.

7. The underwater ultrasonic device of claim 1, further comprising a moving mechanism configured to move at least one of the first ultrasonic transducer and the second ultrasonic transducer.

8. The underwater ultrasonic device of claim 7, wherein the moving mechanism comprises a motor, a gear, a first sliding member and a second sliding member, the first sliding member is connected to one of the first ultrasonic transducer and the second ultrasonic transducer, the second sliding member is connected to another one of the first ultrasonic transducer and the second ultrasonic transducer, the first sliding member and the second sliding member are disposed with respect to each other, the second sliding member has a rack, and the gear is connected to the motor and meshes with the rack.

9. The underwater ultrasonic device of claim 8, wherein the moving mechanism further comprises an elastic member disposed between the first sliding member and the second sliding member, the second sliding member has a restraining portion, and the elastic member abuts against the restraining portion.

10. The underwater ultrasonic device of claim 1, further comprising a rotating mechanism configured to rotate at least one of the first ultrasonic transducer and the second ultrasonic transducer.

11. The underwater ultrasonic device of claim 10, wherein the rotating mechanism comprises a motor, a first gear, a second gear and a rotating member, the rotating member is connected to one of the first ultrasonic transducer and the second ultrasonic transducer, the first gear is connected to the rotating member, and the second gear is connected to the motor and meshes with the first gear.

* * * * *